United States Patent
Jaakkola et al.

(10) Patent No.: US 9,900,058 B2
(45) Date of Patent: Feb. 20, 2018

(54) NEAR-FIELD UHF IDENTIFICATION SYSTEM AND A METHOD FOR IDENTIFYING AN OBJECT OR THE KIND OF AN OBJECT THAT IS OR CONTAINS ELECTRICALLY CONDUCTIVE MATERIAL USING NEAR-FIELD IDENTIFICATION

(71) Applicant: Teknologian tutkimuskeskus VTT, VTT (FI)

(72) Inventors: Kaarle Jaakkola, Espoo (FI); Petteri Koivu, Vantaa (FI); Kaj Nummila, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 14/410,579

(22) PCT Filed: Jun. 20, 2013

(86) PCT No.: PCT/IB2013/055061
§ 371 (c)(1),
(2) Date: Dec. 23, 2014

(87) PCT Pub. No.: WO2014/001976
PCT Pub. Date: Jan. 3, 2014

(65) Prior Publication Data
US 2015/0341088 A1    Nov. 26, 2015

(30) Foreign Application Priority Data
Jun. 28, 2012   (FI) .................................. 20125745

(51) Int. Cl.
*H04Q 5/00*   (2006.01)
*H04B 5/00*   (2006.01)

(52) U.S. Cl.
CPC .......... *H04B 5/0056* (2013.01); *H04B 5/0062* (2013.01)

(58) Field of Classification Search
CPC .......... G06K 19/0723; G06K 7/10366; G06K 19/0716; G06K 19/07749; G06K 7/10158;
(Continued)

(56) References Cited

U.S. PATENT DOCUMENTS 6,700,491 B2 *   3/2004  Shafer ............... G06K 19/0702
                                                           340/572.1
2004/0131897 A1 *  7/2004  Jenson ............... H01M 2/0267
                                                           429/7
(Continued)

OTHER PUBLICATIONS

Antonio Ferrer-Vidal, Ferrer-Vidal et al., "Integration of Sensors and RFID's on Ultra-low-cost Paper based Substrates for Wireless Sensors Network Application," IEEE , 2006, pp. 126-128.*
(Continued)

*Primary Examiner* — Tesfaldet Bocure
(74) *Attorney, Agent, or Firm* — Seppo Laine Oy; Toimi Teelahti

(57) ABSTRACT

A near-field identification system having an object that is or contains electrically conductive material and an ultra-high radio-frequency microstrip transponder. The microstrip transponder having a microstrip line and an identification microchip connected to the microstrip line. The microstrip transponder being on the object at a location where the object has an electrically conductive region, the line following at least one edge of the object. When the identification system is being interrogated by an interrogator from below the system an identification signal from the identification microchip is transmittable from the microstrip line via magnetic near field induced by electric current on the edge of the object to below the object. Also discussed is a method for (Continued)

identifying an object or the kind of an object that is or contains electrically conductive material using near-field identification.

20 Claims, 6 Drawing Sheets

(58) Field of Classification Search
CPC .............. G06K 19/07; G06K 19/0702; G06K 19/0724; G06K 19/07747; G06K 7/10316; H01C 1/2216; G01V 15/00; H04B 5/0056; H04B 5/008; H04B 5/0062
USPC ......... 340/10.1; 235/492; 455/41.2; 429/185
See application file for complete search history.

(56) References Cited

U.S. PATENT DOCUMENTS

| | | | | |
|---|---|---|---|---|
| 2006/0293014 | A1* | 12/2006 | Forster | G06K 19/0724 455/274 |
| 2007/0164868 | A1* | 7/2007 | Deavours | G06K 19/07749 340/572.7 |
| 2012/0313758 | A1* | 12/2012 | Savarese | G06K 7/10079 340/10.1 |

OTHER PUBLICATIONS

Mary Catherine O'Connor, "Gen 2 EPC Protocol Approved as ISO 18000-gC," RFID Journal, 2006, pp. 1 of 1.*

* cited by examiner

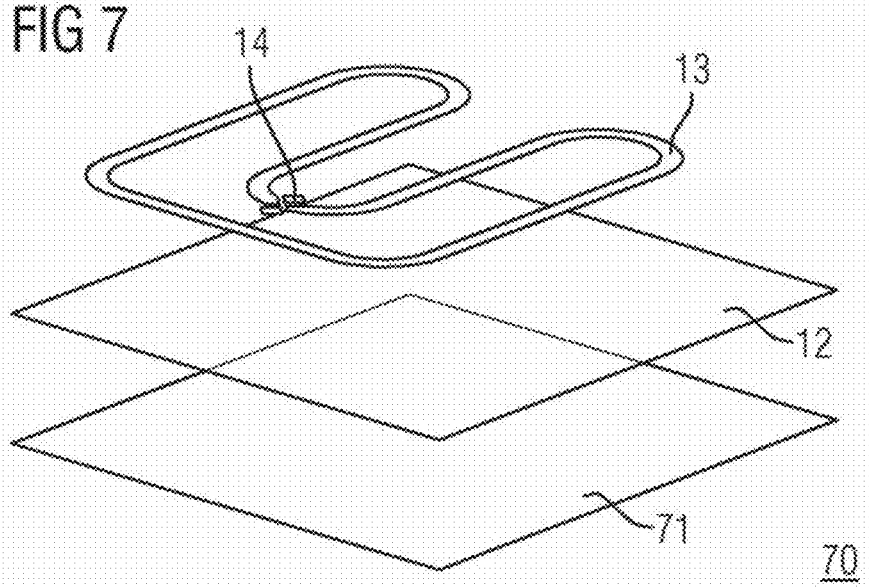
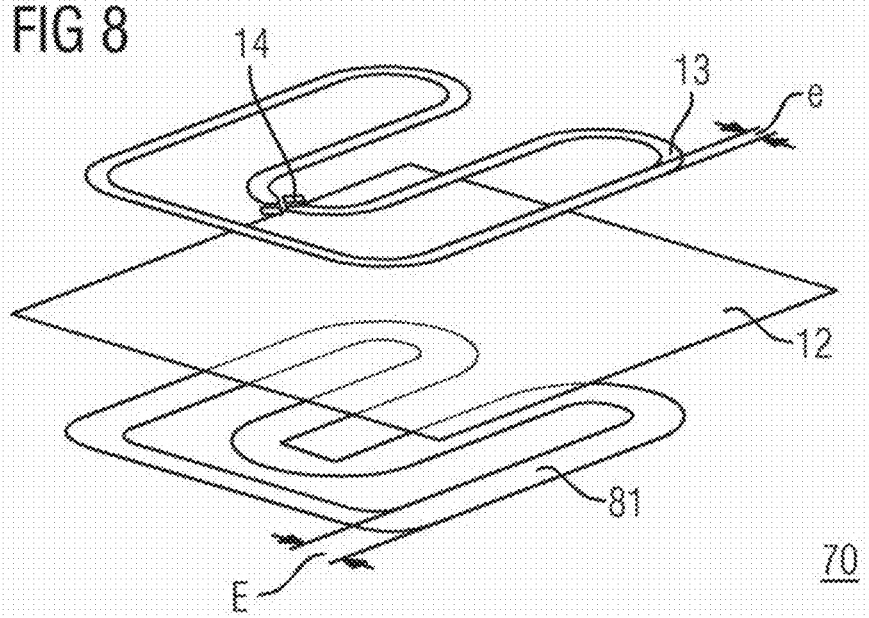

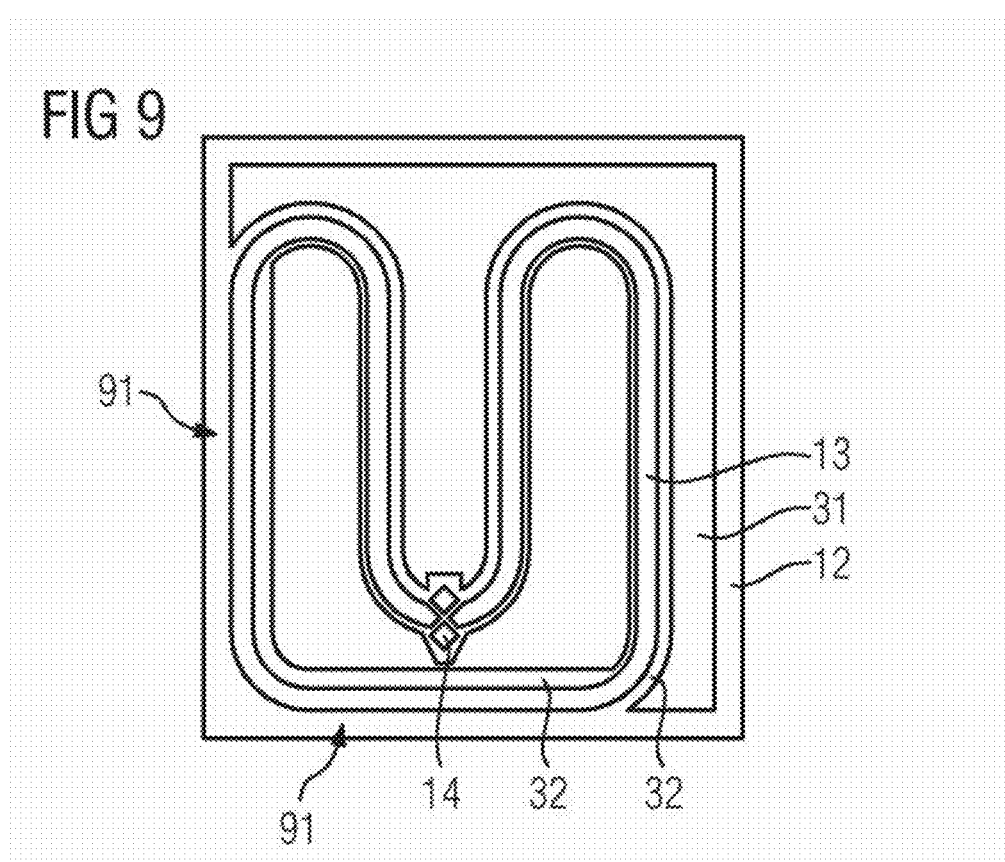

NEAR-FIELD UHF IDENTIFICATION SYSTEM AND A METHOD FOR IDENTIFYING AN OBJECT OR THE KIND OF AN OBJECT THAT IS OR CONTAINS ELECTRICALLY CONDUCTIVE MATERIAL USING NEAR-FIELD IDENTIFICATION

FIELD OF THE INVENTION

The invention is in the field of identification of objects by means of ultra-high radio-frequency waves.

BACKGROUND ART

Several authors write that ultra-high radio-frequency based identification (UHF RFID) of objects that are or contain electrically conductive material is challenging.

Mohammed et. al in their article "An RFID Tag Capable of Free-Space and On-Metal Operation" published by Information and Telecommunications Technology Center, University of Kansas, Lawrence, Kans. 66045, USA, propose an RFID tag that is approximately 142 mm×30 mm large and 3.18 mm thick. With regard to tags intended be used on a metal surface, the thickness is critical. An RFID tag having as its dimensions as proposed by Mohammed et al. could be used for laptop batteries if it were thinner and cheaper.

Eunni et al. in their article "A Novel Planar Microstrip Antenna Design for UHF RFID", published in Systemics, Cybernetics and Informatics, Vol. 5, Number 1, propose a planar microstrip antenna design on which the antenna layer is placed on a substrate that is placed on a metallic object. The matching network has a vertical length of 12.4 mm and a horizontal length of 30 mm. Even though the size of the matching circuit alone is not of importance, it is the total size of the antenna is 140 mm×72 mm that matters. Normally, one tries to avoid a matching circuit in connection with an RFID tag, except when a broadband response is required.

Koivu in his thesis "Thin RFID Solution for Battery Identification", EVTEK University of Applied Sciences, Institute of Technology, 2008, proposes a circular button tag configuration, in which an RFID tag is integrated in a polyethylene terephthalate (PET) sheet that is placed on a 150 μm thick paper sheet that is in turn placed on a ferrite sheet. As ferrite he uses magnetic sheets/radio wave absorbers of type Flexield IRLG4 manufactured by TDK, having a thickness of 0.25 mm or 0.50 mm. The circular button tag is placed in corner of a mobile phone battery and he was able to achieve a read range of over four centimeters with all tested battery models if the tag was placed near the edges of the battery. A reading distance in this range can be considered to be sufficient for the intended use of remotely identifying mobile phone batteries.

OBJECTIVE OF THE INVENTION

The implementations suggested by Mohammed et al. and Eunni et al. have a strongly elongated shape and are thus not suitable for use with objects that have dimensions smaller than 10 cm. Most current rechargeable batteries of electronic equipment are, however, considerably smaller. For example, widely used lithium-ion rechargeable batteries for mobile phones have as their dimensions approximately 5×4×0.8 cm. It is simply not possible to use the configurations proposed by Mohammed et al. or Eunni et al. to identify a rechargeable battery of the mentioned kind having dimensions comparable with those currently in use. Furthermore, and even more importantly, the thickness of at least 2 mm and manufacturing cost of their solutions make the proposed configurations currently unappealing.

The circular button tag configuration proposed by Koivu has a diameter of ca. 1.3 cm which is an appropriate size for use in indentifying rechargeable batteries. However, his solution is not appealing from the manufacturing point of view, since the ferrite sheet dramatically increases the manufacturing cost that otherwise would be ca. 2-3 cent/piece. The solution would not work without the ferrite sheet.

It is an objective of the present invention to reduce the manufacturing cost of a near-field identification system.

SUMMARY OF THE INVENTION

This objective can be met with a near-field identification system according to claim 1 and with a method according to claim 9.

The dependent claims describe advantageous aspects of the system and of the method.

ADVANTAGES OF THE INVENTION

The identification system comprises an object that is or contains electrically conductive material, and an ultra-high radio-frequency microstrip transponder comprising a microstrip line and an identification microchip connected to the microstrip line. The microstrip line forms an electric loop and is meandered.

The microstrip transponder is on the object at a location where the object has an electrically conductive region and is arranged in such a manner that the line follows at least an edge of the object. Advantageously, if the line follows at least two edges of the object, a larger reading angle and volume may be obtained, but with certain rechargeable batteries in particular it may be possible to follow only one edge if the end of the rechargeable battery has a problematic shape such as is the case with some rechargeable batteries for laptops.

The system is configured to transmit an identification signal from the microstrip line via magnetic near field induced by electric current on the edge of the object to below the object in such a manner that the identification microchip is identifiable, when the identification system is being interrogated by an interrogator from below of the system. In this way, the identification microchip can be identified, thereby enabling identification of the object and/or of the kind of the object.

The significant improvement to the tags proposed by Mohammed et al., Eunni et al. and Koivu is that, thanks to the new configuration, it is not necessary to send a ultra-high radio-frequency signal that would as such go through the object but it suffices to have a magnetic near field induced by electric current on the edge of the object. Electric current on the microstrip line induces secondary current on the edge of the object which induces a magnetic near field enabling the electric coupling between the transponder and the interrogator. In this manner, it is possible to reduce the manufacturing cost since no ferrite is necessary, in contrast to Koivu's solution; in addition the configuration can be made compact enough, in contract to solutions proposed by Mohammed et al. and Eunni et al.

If the object is a rechargeable battery for an electronic device, in particular a lithium-ion based rechargeable battery or a rechargeable battery comprising metal substrate for storing energy, the invention enables detecting the rechargeable battery type to select an appropriate recycling program or a proper manner of disposal. Such rechargeable batteries are particularly often used in mobile phones. It is necessary to be able to recognize whether a particular rechargeable battery is Lithium-ion battery, Lithium-ion polymer battery, Nickel-Cadmium battery, or Nickel-metal hydride battery. The object may be any other metallic object. In particular, in process industry there are several of such objects used. The invention may be particularly advantageously used if the object is a casting mould, for example.

Advantageously, the microstrip line contains or consists of aluminum, copper or silver. If aluminum or copper, the microstrip line can be manufactured by etching. If silver, the microstrip line can be manufactured by automatically printing it by using a silver-based ink.

If the microstrip transponder comprises a foil to which the microstrip line has been attached and which has been attached onto the object or onto a foil, paper or wrapping or cover surrounding the object, there is no need to further insulate the microstrip line from the metallic parts of the object to prevent it being short-circuited. Advantageously, the foil is or comprises polyethylene teraphtalate (PET), polyethylen (PE), polystyren (PS), polypropylene (PP), polyacetylene (PA), acrylonitrile butadiene styrene (ABS), polycarbonate (PC) or paper, since the foil does not have to be highly lossless. The attachment onto the object or onto the foil, paper or wrapping or cover surrounding the object can be implemented by gluing; the thickness of the glue layer can be 10 to 30 µm, preferably 20 µm, for example. Alternatively to the gluing, the microstrip transponder can be wickled in a foil, paper, wrapping or cover surrounding the object.

The polyethylene terephthalate foil has as its thickness of 40-60 µm, most advantageously 50 µm. The microstrip line has as its thickness of 16 to 20 µm, most advantageously 18 µm.

The microstrip line can be made compact. Advantageously, it has as its dimensions approximately 10-14 mm×13-17 mm, most advantageously 12 mm×15 mm.

Advantageously, the microstrip line is located at a distance following at least two neighbouring edges. Preferably the distance is 0.8-1.2 mm, most advantageously 1.0 mm. This enables a good formation of magnetic near field in the object and thus improves the identifiability of the identification microchip.

The method for identifying an object or the kind of an object that is or contains electrically conductive material, the object in particular being a rechargeable battery for a mobile phone or for any other electronic device, comprises the steps of:
a) attaching a microstrip transponder to the object to create a system according to the invention;
b) interrogating the system by an interrogator;
c) receiving an identification signal of the identification microchip as magnetic near field coupling from the object at a side of the object, such as an opposite side of object from where the microstrip transponder is located; and
d) using the identification signal to identify the object or the kind of an object.

The method can be worked from below of the objects that are to be identified or the kind of which is to be identified. We have reached identification distances of up to 10 cm. This approach is apt to reduce the space requirement to carry out the identification process, since now it is not necessary to have free space on above of the system that is to be identified. This supports the factory manager's or recycling entrepreneur's work in organising space utilisation more effectively in the premises in which the identification process is going to be carried out. In the rechargeable battery identification process, the rechargeable batteries that are to be identified are conveyed on a conveyor belt. So then the interrogator device's antenna can be located below the conveyour belt.

If the interrogating and identification are performed according to technical UHF RFID standard and/or EPC gen 2 standard (ISO 18 000-6), interrogation and identification equipment that are readily commercially available can be used for the process.

LIST OF DRAWINGS

In the following the invention is described in more detail by way of the examples shown in the attached drawings in FIG. 1 to 9, of which:

FIG. 7 and 8 illustrate a transponder with an integrated ground plane in a secondary layer; and FIG. 9 illustrates a transponder with an asymmetric ground plane for optimisation of the two edges of the transponder.

Same reference numerals refer to same elements in all FIG.

DETAILED DESCRIPTION

Figure 1:
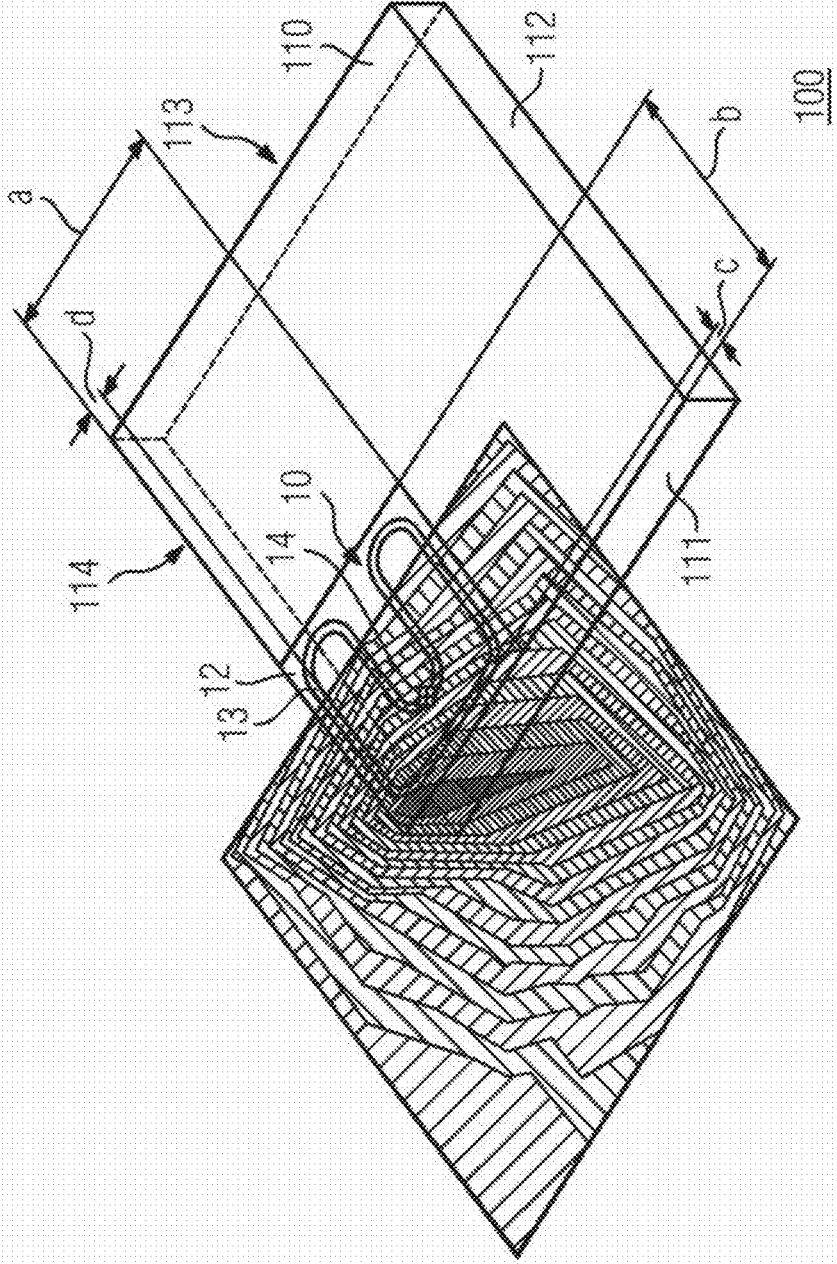
FIG. 1 represents the magnetic field distribution 5 mm below a near-field identification system that comprises a 5 mm thick aluminium brick on the top of which a ultra-high radio-frequency microstrip transponder transponder has been attached, during interrogation.

We have invented a new system utilizing low-cost miniature sized UHF RFID transponder 10 for marking small objects 110, such as rechargeable batteries of mobile phones and other electronic devices, that have at least one metal surface. As objects 110, any metallic and non-metallic objects can be used. In particular, we are investigating the possibility to use casting moulds as objects.

With UHF we mean a frequency range from 860 MHz to 960 MHz.

Recycling of rechargeable batteries of mobile phones and other electronic devices requires an efficient way of associating some critical information with the rechargeable battery and being able to read it automatically at the end of the life cycle of the rechargeable battery.

RFID is a very efficient technology as such, but the lack of a low cost transponder that would be small and especially thin that could be used on a metal surface has prevented the practical implementation.

With our system, a new kind of a near field UHF RFID transponder that is small, thin and works on a metal surface can be realised.

The microstrip transponder 10 does not need any special layers or other parts that would increase the fabrication cost or size. Instead, the transponder 10 utilizes the properties of the metallic object 100 itself and can be fabricated by the standard processes used to produce the label transponders that are the predominant type of UHF RFID transponders on todays market.

In recycling of rechargeable batteries, which is nowadays required by law in the EU, it is crucial to carry information e.g. about the rechargeable battery type along with the rechargeable battery through its entire life cycle.

Optical codes have been tested for the purpose to carry along identification information of rechargeable batteries, but dirt and mechanical wear and schratches of the rechargeable battery surface make them often unreadable in practice.

Consequently, the benefits of marking rechargeable batteries with RFID have been acknowledged. Therefore, also some prior RFID solutions exist. They include the usage of near field HF and UHF RFID tags with a ferrite layer added between the tag and the tagged object. This has been proven to be a working concept, but the problem thereof is the added cost due to the special ferrite layer. The ferrite layer also increases the thickness of the tag. In the solution according to the invention no special layers between the tag and the tagged object are needed and thus the transponder is as inexpensive as a small near field UHF RFID inlay.

A simple and low cost 2D-label RFID transponder, the antenna of which is fabricated by etching on a metallized plastic foil, is the predominant design on today's market of UHF RFID transponders. However, this antenna solution does not work when put directly on a metallic object.

There are more expensive and large on-metal transponders available that have been developed to be used on metal objects, but to be used with small and low-cost objects such as mobile phone batteries they are a way too thick and expensive to be considered as a real alternative. Examples of such solutions can be found in NOF Corporation's TAGAT™ product series brochure.

The microstripe transponder 10 makes it possible to mark small metal surfaced objects 110 by requiring a small volume and area and in a low-cost manner. Additionally to mobile phone rechargeable batteries and other electronic devices' rechargeable batteries, there are many other applications that benefit from the new low cost microstrip transponder 10.

FIG. 1 shows a ultra-high radio-frequency microstrip transponder 10 comprising a microstrip line 13 and an identification microchip 14 connected to the microstrip line 13 assembled on or into a foil 12. As the foil, we use polyethylen (PE), polystyren (PS), polypropylene (PP), polyacetylene (PA), acrylonitrile butadiene styrene (ABS), polycarbonate (PC), paper or any other suitable material.

Figure 2:
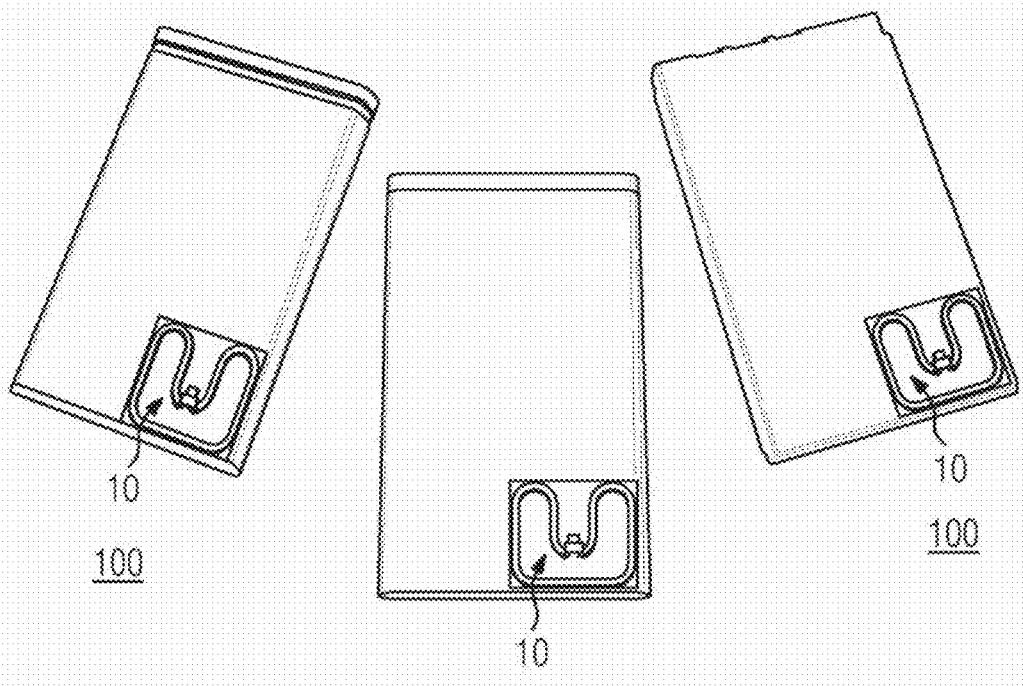
FIG. 2 shows fabricated prototypes attached into mobile phone batteries.

The object 110 in FIG. 1 is a 5 mm thick aluminum brick. However, as illustrated in FIG. 2, instead of the aluminum brick, a rechargeable battery of a mobile phone or of other electronic can be used as the object 110. Important is only that the object 110 is or contains electrically conductive material and that it has at least one, preferably at least two edges 111, 112, 113, 114, of which most advantageously at least two are neighbouring so that there is at least one corner 111->114 available.

The microstrip transponder 10 is on the object 110 at a location where the object 110 has an electrically conductive region. The microstrip line 13 follows at least one edge, in the case of our example two edges 111, 114 of the object 110.

The system 100 has been configured, when identification system is being interrogated by an interrogator from below or from any other direction of the system, in such a manner that an identification signal from the identification microchip 14 is transmittable from the microstrip line 13 via magnetic near field induced by electric current on the edge of the object 100 to below the object 100 in such a manner that the identification microchip 14 is identifiable.

The ultra-high radio-frequency microstrip transponder 10 is based on utilizing magnetic near field coupling between the system 100 and the interrogator that is also known as the reader device.

Traditional near field UHF RFID tags that are small plain lines do not work on metal, since their magnetic fluxes do not penetrate through the metal surface. Instead, the energy of the magnetic field is lost due to eddy currents generated onto the metal.

In the microstrip transponder 10, generating the magnetic flux needed is based on inducing currents at the edges 111, 114 of the object 110 on which the microstrip transponder 10 has been placed, which generate magnetic flux that extends around the object 110. This is achieved by placing the microstrip line 13 near the respective edges 111 and 114. The microstrip transponder 10 is technically a meandered microstrip line, the ground plane of which is formed by the object 110.

When placed near one edge 111, 114 or corner (111->114) of the object 110, the part of the microstrip line 13 parallel to the respective edge 111, 114 induces currents on the edge 111, 114.

The currents act as sources of the magnetic field H via which the coupling to the interrogator (reader device) takes place. The magnetic field H extends around the object 100 and the microstrip transponder 10 can be read using an appropriate near field antenna from several directions.

In order to get the radio frequency power well coupled between the reader device and the system 100, the feed impedance of the microstrip line 13 should have a certain value. In practice, the reactance of the microstrip line 13 should be 100 to 250Ω depending on the IC used. Practically, this means that the microstrip line 13 should be rather long, typically several cm. However, the microstrip line 13 can be meandered into curved form, keeping the outer size of the microstrip transponder 10 small.

The microstrip transponders 10 shown in FIG. 1 and 2 are prototypes.

In FIG. 1 we have computed the magnetic field distribution 5 mm below the object 110 that is a 5 mm thick aluminium brick on the top of which the microstrip transponder 10 has previously been attached.

The size a×b of the prototype microstrip transponder 10 is 12 mm×15 mm. So, even though the recycling of rechargeable batteries is an important and probably the first practical application of the system 100 and method, the technology makes it possible to equip various metal objects 110 with the small microstrip transponder 10.

The annual fabrication volume of mobile phone rechargeable batteries is counted in hundreds of millions. The price of a microstrip transponder 10 in large volumes is about 3 eurocents so that in principle all rechargeable batteries can be equipped with the microstrip transponder 10.

Due to the low price, small size and planar label-like structure, the usage of the microstrip transponder 10 can be extended into consumer products, such as metallic food and drink cans. There are also lots of possible industrial applications in which the invention enables individual tracking of metallic parts e.g. in a factory environment. Such include car and aviation industry. Small and low cost microstrip transponder 10 makes it also possible to tag smaller and cheaper parts and modules than before.

As an alternative to the ultra-high radio-frequency microstrip transponder 10 that basically comprises a microstrip line 13 on top of a foil 12 of insulating substrate, ultra-high radio-frequency microstrip transponders 30, 50 and 70, examples of which are shown in FIG. 3 to 8 can be used.

Transponder 30, 50, 70 can be equipped with some additional metal structures that form an integrated ground plane. These structures include metal 31, 51, 52 around the microstrip line 13 (FIG. 3+4 and FIG. 5+6) and metal 71, 81 placed below the microstrip line 13 on the opposite side of the foil 12 of insulating substrate (FIG. 7+8).

Figure 3:
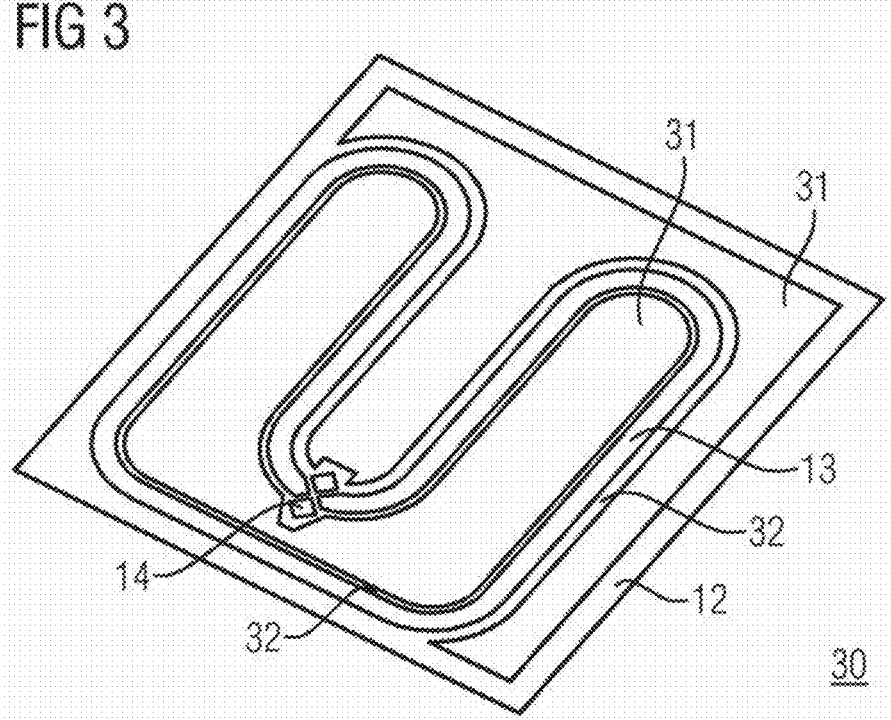
FIG. 3 and 4 illustrate a transponder with an integrated co-planar ground plane.
Figure 4:
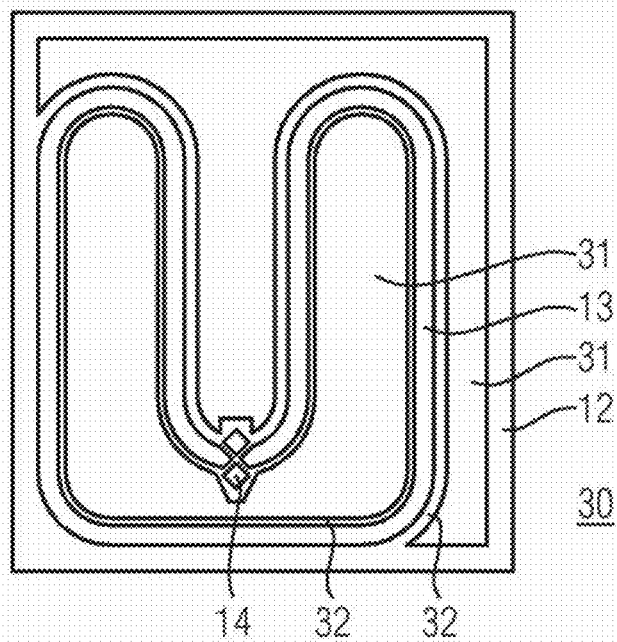
Figure 5:
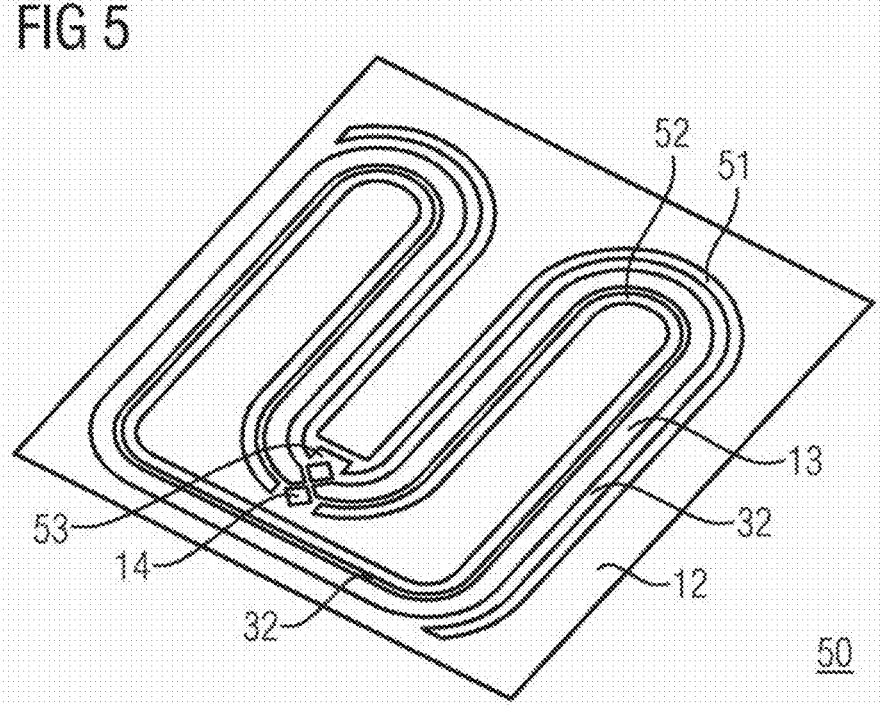
FIG. 5 and 6 illustrate a transponder with an integrated co-planar ground plane that has a minimized area.
Figure 6:
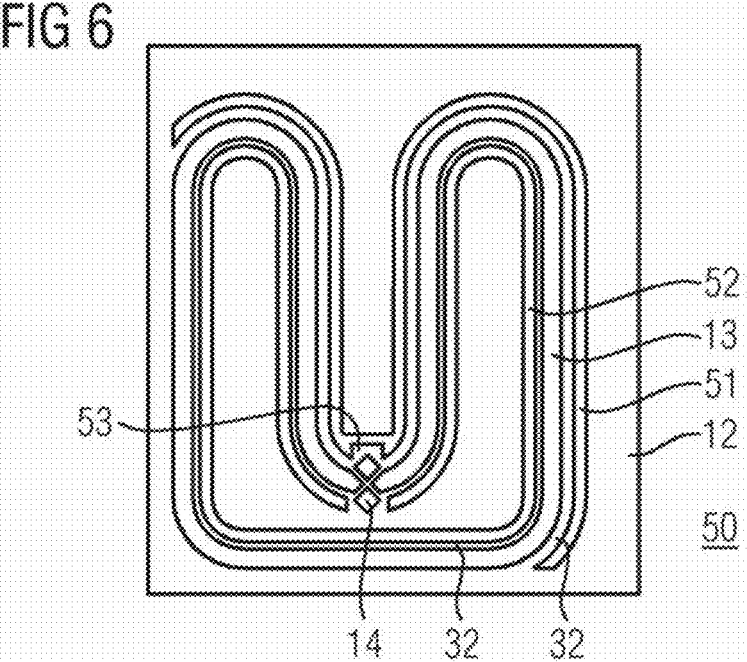

The metal can be added around the microstrip line 13 to form a structure commonly known as a coplanar waveguide in which the ground plane of the microstrip line 13 or part of it is formed on the same metal layer as the main conductor of the microstrip line 13, leaving a horizontal gap 32 between the microstrip line 13 and the ground plane. The ground plane can either fill the whole area around the microstrip line 13 (as illustrated in FIG. 3+4 with metal 31) or be just a rather narrow conductor or a pair of conductors on the sides of the microstrip line 13 (as illustrated in in FIG. 5+6 with metal 51, 52, optionally exhibiting an indentation 53 at the location of the microchip 14). Leaving the ground plane of the transponder 30, 50 partly open leaves some space for the magnetic flux to penetrate through the object 110 to be tagged if the object 110 does not have metal on that particular area. If the transponder 30, 50, 70 is fabricated by printing, it is also beneficial to save conductive ink.

Instead of this arrangement, or in addition to it, additional metal layer 71, 81 can be added on the bottom of the insulating substrate in transponder 70. The metal layer 71 can cover the whole transponder 70 area as illustrated in FIG. 7 or the metal layer 81 can follow the form of the microstrip line 13 on the top of the transponder 70, having width E that is larger than width e of the microstrip line 13 as illustrated in FIG. 8. The benefit is the same as in the case of transponder 50 shown in FIG. 5 and 6.

Implemented either way, the added metal around or beneath the microstrip line 13 stabilizes the feed impedance of the transponder 30, 50, 70 to be less dependent on the distance between the transponder 30, 50, 70 and the object 110 to be tagged. It also enhances the operation of the transponder 30, 50, 70 when the conductivity of the object 110 to be tagged is limited or the surface of the object is uneven. As a result, the transponder 30, 50, 70 can be made more robust and applicable for different applications and objects 110 without sacrificing the read range. Even though the transponder 30, 50, 70 is ideal to be used on metal objects, by adding the ground metal 31, 51, 70, 81 its application area can be extended also into non-conducting objects as well as to metal objects of difficult shapes.

The structure of the transponder can also be asymmetric as illustrated in FIG. 9. As typically one or two edges of the microstrip line 13 induce the magnetic field generating currents to the edge of the object 110, it is advantageous to leave some non-metal space 91 in the ground plane around these parts so that the magnetic field will be generated in the right area. Example of this type of an implementation of the coplanar version of the transponder is shown in FIG. 9. In the case of the two layer implementation it is possible to leave the coupling area of the transponder without the ground plane.

The size a×b of the transponders 30, 50, 70 shown in FIG. 3 to 9 are most advantageously so that a=20+/−2 mm and b=22+/−2 mm but the dimensioning discussed earlier can also be used.

The invention should not be understood as being limited only to the attached claims, but should be understood as including all their legal equivalents.

The invention claimed is:

1. A near-field UHF identification system comprising:
   an object that is or contains electrically conductive material; and
   an ultra-high radio-frequency microstrip transponder comprising a microstrip line and an identification microchip connected to the microstrip line;
   wherein:
   the microstrip transponder is attached to the object at a position where the object has an electrically conductive region, the line being positioned along at least one edge of the object in such a manner that
   when the identification system is being interrogated by an interrogator from below the system, an identification signal from the identification microchip is transmittable from the microstrip line via magnetic near field induced by electric current on the edge of the object to below the object in such a manner that the identification microchip is identifiable.

2. The near-field UHF identification system according to claim 1, wherein the object is a rechargeable battery for an electronic device.

3. The near-field UHF identification system according to claim 1, wherein the microstrip line consists of aluminum, copper or silver.

4. The near-field UHF identification system according to claim 1, wherein the microstrip transponder comprises a foil to which the microstrip line has been attached and which has been attached onto the object or onto a foil, paper or wrapping or cover around the object.

5. The near-field UHF identification system according to claim 4, wherein: the foil has a thickness between 40-60 µm and the microstrip line has a thickness between 16 and 20 µm.

6. The near-field UHF identification system according to claim 1, wherein: the microstrip line has as its dimensions (a×b) approximately 10-14 mm×13-17 mm.

7. The near-field UHF identification system according to claim 1, wherein: the microstrip line is located along at least two neighboring edges at a distance between 0.8 and 1.2 mm from said edges.

8. The near-field UHF identification system according to claim 1, wherein the microstrip transponder further comprises an integrated ground plant that is at least one of:
   co-planar with the microstrip line and separated from the microstrip line by a distance;
   co-planar with the microstrip line and has a strip-like shape following the shape of the microstrip line;
   in a secondary layer, the integrated ground plane advantageously having a strip-like shape following the shape of the microstrip line; and
   asymmetrically placed in relation to the microstrip line.

9. The near-field UHF identification system of claim 1 wherein the microstrip line is located along the at least one edge of the object at a distance between 0.8 mm and 1.2 mm.

10. The near-field UHF identification system of claim 1 wherein the microstrip line has a thickness between 16 to 20 µm.

11. A method for identifying an object or the kind of an object that is or contains electrically conductive material using near-field identification, the method comprising the steps of:
   attaching a microstrip transponder to the object to create a system comprising:
   an object that is or contains electrically conductive material; and an ultra-high radio-frequency microstrip transponder comprising a microstrip line and an identification microchip connected to the microstrip line;

wherein:

the microstrip transponder being on the object at a location where the object has an electrically conductive region, the line being located along at least one edge of the object; and the system being configured, when identification system is being interrogated by an interrogator from below of the system, in such a manner that an identification signal from the identification microchip is transmittable from the microstrip line via magnetic near field induced by electric current on the edge of the object to below the object in such a manner that the identification microchip is identifiable;

interrogating the system by an interrogator;

receiving an identification signal of the identification microchip as magnetic near field coupling from the object at a side of the object; and using the identification signal to identify the object or the kind of the object.

12. The method according to claim 11, wherein the interrogating and identification are performed according to technical UHF RFID standard and/or EPC gen 2 standard (ISO 18 000-6).

13. The method according to claim 11, wherein the microstrip line is located along the at least one edge of the object at a distance between 0.8 mm and 1.2 mm.

14. The method according to claim 11, wherein: the foil has a thickness between 40-60 μm and the microstrip line has a thickness between 16 and 20 μm.

15. The method according to claim 11, wherein: the microstrip line has as its dimensions (a×b) approximately 10-14 mm×1-17 mm.

16. The method according to claim 11, wherein: the microstrip line is located along at least two neighboring edges at a distance between 0.8 and 1.2 mm from said edges.

17. A near-field UHF identification system comprising:

an object that is or contains electrically conductive material; and an ultra-high radio-frequency microstrip transponder comprising a microstrip line and an identification microchip connected to the microstrip line;

wherein:

the microstrip line forms a loop on only one surface of the object, the identification microchip being part of the loop;

the system being configured, when the identification system is being interrogated by an interrogator, in such a manner that an identification signal from the identification microchip is transmittable from the microstrip line via magnetic near field, wherein the magnetic near field is induced by electric current on the edge of the object in such a manner that the identification microchip is identifiable.

18. The near-field UHF identification system according to claim 17, wherein the microstrip transponder is located on the object at a location where the object has an electrically conductive region and the microstrip line follows at least one edge of the object.

19. The near-field UHF identification system according to claim 17, wherein the microstrip line comprises a path with at least one non-orthogonal curve.

20. The near-field UHF identification system according to claim 17, wherein the transponder comprises a foil to which the microstrip line has been attached wherein the foil has been attached onto the object or onto another foil, paper or wrapping or cover around the object.

* * * * *